United States Patent [19]

Krauter

[11] Patent Number: 5,140,975
[45] Date of Patent: Aug. 25, 1992

[54] INSERTION TUBE ASSEMBLY FOR PROBE WITH BIASED BENDING NECK

[75] Inventor: Allan I. Krauter, Syracuse, N.Y.

[73] Assignee: Welch Allyn, Inc., Skaneateles Falls, N.Y.

[21] Appl. No.: 657,741

[22] Filed: Feb. 15, 1991

[51] Int. Cl.⁵ ............................................. A61B 1/00
[52] U.S. Cl. ........................................ 128/4; 128/6
[58] Field of Search ................................. 128/6, 4

[56] References Cited

U.S. PATENT DOCUMENTS

| 4,998,527 | 3/1991 | Meyer | 128/4 |
| 5,018,506 | 5/1991 | Danna et al. | 128/4 |
| 5,058,568 | 10/1991 | Iriou et al. | 128/4 |

FOREIGN PATENT DOCUMENTS

| 78017 | 5/1983 | European Pat. Off. | 128/4 |
| 11011 | 3/1988 | Japan | 128/4 |

Primary Examiner—John G. Weiss
Attorney, Agent, or Firm—Wall and Roehrig

[57] ABSTRACT

An elongated flexible probe has a tubular fluid-controlled bending neck. A connector joins the bending neck to a flexible elongated insertion tube formed of an elastic tubing on which a filament braid is disposed. The braid is nearly circumferential, i.e., with a high braid angle, so that internal pressure in the insertion tube will not expand it laterally, but the braid will permit axial movement. This accommodates pumping action of the bending neck on optical fibers and wires that pass from the distal tip back through the bending neck, connector, and insertion tube.

8 Claims, 2 Drawing Sheets

INSERTION TUBE ASSEMBLY FOR PROBE WITH BIASED BENDING NECK

BACKGROUND OF THE INVENTION

This invention relates to devices that respond to fluid pressure by bending. This invention is more specifically concerned with an elongated flexible probe having a distal steering section, and in which the steering section is of the fluid bendable type. The invention is also concerned with a main insertion tube construction that compensates for axial stretching of the bending neck.

A borescope, endoscope, or similar flexible probe can be generally configured as an elongated flexible insertion tube with a viewing head at its distal or forward end and a control housing for controlling or steering the distal or forward end. The typical borescope has a bendable tubular steering section or articulation section at the distal end adjacent the viewing head. The steering section typically comprises a series of alternating wobble washers and spacers, with control cables that extend through the wobble washers and then through the remainder of the flexible insertion tube. The steering cables connect with a steering control unit in the control section. Each such pair of cables is differentially displaced to bend the steering section in a bending plane. In this manner, the viewing head can be remotely oriented to facilitate the inspection of an object. Borescopes are often required to bend in narrow, tortuous passageways, so the radial dimension of the borescope is often quite limited, i.e., 6 mm diameter. Also, the pathway to the object or target can be quite long, which then requires the insertion tube and the steering cables to be rather long, e.g., fifteen feet or more.

A number of cable-actuated articulation or steering mechanisms are known, and typical ones are discussed in U.S. Pat. Nos. 3,610,231; 3,739,770; 3,583,393; 3,669,098; 3,779,151; and 4,347,837. Another steering mechanism is described in U.S. Pat. No. 4,700,693.

These cable-actuated articulation mechanisms require the cables to have a significant amount of slack or play because bends and coils in the insertion tube effectively shorten the cables and because the articulation section bends at discrete points rather than following a smooth arc. However, in many applications, such as jet engines, the articulation section must bend rather precisely to penetrate the tortuous passages into the area to be inspected without damaging delicate parts. For these reasons, cable tension must be limited and cable slack must be minimized. Moreover, where the insertion tube is long, extra cable slack is often included to accommodate the increased cable tightening due to the substantial coiling and bending of the insertion tube through which the steering cables pass.

An arrangement to keep steering cables as short as possible is described in U.S. Pat. No. 4,794,912. That patent describes a braid-and-bladder pneumatic or hydraulic "muscle," i.e., linear traction motor, that addresses many of the problems found in these prior-art steering mechanisms. Specifically, fluid dynamic muscles mounted adjacent the distal end of the insertion tube are actuated by pneumatic or hydraulic pressure supplied through small flexible tubes within the borescope insertion tube. Short steering cables connect the respective muscles with the articulation mechanism. As fluid pressure is applied differentially to a pair of muscles, the cables move differentially and the articulation mechanism bends the steering section a desired amount.

While this system avoids many of the above-mentioned problems, especially those associated with extremely long cables, there are residual problems because of the reliance on an otherwise conventional cable steering mechanism. The steering section is rather complex and expensive, and does not follow a natural arc, as mentioned before. Further simplification by replacing the cable driven steering mechanism should reduce or eliminate these residual drawbacks, but until very recently suitable alternative steering mechanisms have eluded those in the art.

A fluid bendable steering section for a borescope or endoscope is described in copending U.S. patent application Ser. No. 539,232, filed June 25, 1990, now U.S. Pat. No. 5,018,506, granted May 28, 1991. In this arrangement, there is an articulation or steering section formed of an elongated tubular elastomeric bladder and a tubular braid disposed over the bladder to confine it so that when the bladder is inflated it expands the braid laterally but shortens it axially. A distal fitting, which can also carry the viewing head, seals the distal end of the bladder and serves as a point for mechanical attachment to the distal end of the braid. A proximal connector sealably fits the proximal end of the bladder and anchors the proximal end of the braid. A central passage through the connector communicates fluid pressure from a controlled fluid pressure source (i.e., pneumatic or hydraulic) to the interior of the bladder for controllably inflating same. A resiliently bendable, but axially incompressible spine is disposed between the bladder and the braid and extends along one side of the longitudinal axis of the bending neck. The spine includes clamping sections at its proximal and distal ends for mechanically affixing the spine to the proximal connector and the distal fitting. When fluid pressure is applied to the interior of the bladder, the braid expands laterally and shortens axially on the unsupported side, i.e., on the side away from the spine. This bends the neck a controlled amount that depends on the fluid pressure applied. The gas or liquid pressure is communicated to the inside of the bending neck through the inside of the insertion tube, which is attached to the proximal end of the proximal connector.

In a preferred mode, the spine is biased, or naturally formed in an arc that is bent to the spine side of the bending neck. When the applied pressure is at a zero or threshold pressure, the neck is biased to that side. When full pressure is applied, the neck is bent arcuately in the opposite direction. At an intermediate pressure, the bending neck is substantially straight. The degree of curvature within the plane of bending is substantially proportional to the applied pressure.

The viewing head, which can be optical i.e. (fiber optic) or video (e.g., a CCD imager) can be situated in the distal fitting of the bending neck. A signal conduit or bundle, which can be a wire bundle in the case of a video device or a fiber optic bundle in the case of an optical device, passes from the head through the distal fitting, then along the axis of the bladder and through a central passage in the proximal connector, and thence through the insertion tube exiting to a suitable viewing device. In either type of probe, a fiber optic bundle is also used to carry illumination to the viewing head for illuminating a target in an enclosed area. A clearance of the passage with respect to the signal conduit and fiber optic bundle can serve to communicate fluid pressure through the insertion tube to the interior of the bladder.

This braid-and-bladder bending neck provides two-way steering (i.e., in a single bending plane) without cables, cable sheaths, or wobble washers. The diameter of the bending neck can be made extremely small, permitting a steerable probe to be constructed of small diameter, e.g. 4 mm. The neck bends substantially along a true arc over its operating range, e.g. from −90 or more to +90 or more degrees of arc.

The biased muscle bending neck deflects because of axial contraction of that part of its braid located radially away from the spine. The wires and illumination fibers are between this axially contracting braid and the axially rigid spine. The wires and fibers are effectively rigid, in the axial direction, and are fixed to the viewing head. Consequently, during deflection of the bending neck both the wires and the fibers must move axially relative to the proximal end of the bending neck. This "pumping" of the wires and fibers must be accommodated somehow in the probe.

In conventional probes, the wires and fibers are free to move axially in and out of the control section when the steering section is articulated or deflated. However, in a biased bending neck probe, where in the inside of the insertion tube is pressurized for steering, the "pumping" problem is more complicated. In a probe of this type, the insertion tube proximal end, wires, and optical fibers are all joined together. This forms a gas seal (or other fluid seal) through which the fibers and wires must pass. The gas seal is necessary to accommodate pressurizing the insertion tube to carry gas or liquid. Therefore, the fibers and wires are not free to accommodate any axial movement where they exit the insertion tube. As a result, the axial tension or compression in the wires and fibers reduces the articulation range of the steering section. Also, the bending neck imposes axial forces on the fiber optic bundle and on the electric wires because they do not stretch and compress with the bending neck. These forces can damage the wires and fibers, especially if either or both should buckle when the force is compressive.

OBJECTS AND SUMMARY OF THE INVENTION

It is an object of this invention to provide an improved fluid pressure steerable probe that avoids the drawbacks mentioned above.

It is another object of this invention to provide a probe in which the insertion tube enjoys axial compression or expansion to compensate for the lengthening and shortening of the bendable neck steering section during steering.

According to an aspect of this invention, an endoscope, borescope, or other probe has an insertion tube assembly which includes at its distal end an articulation or steering section of the type formed of a fluid pressure actuated biased bending neck; that is, the steering section has an elongated tubular elastomeric bladder and a tubular braid disposed over the bladder to confine it so that when the bladder is inflated it expands the braid laterally, but shortens it axially. There is a distal fitting that seals the bladder, serves as a point for mechanical attachment of the braid, and supports the viewing head. There is a proximal connector that sealably fits the proximal end of the bladder, anchors the proximal end of the braid, and couples the steering section to the main part of the flexible insertion tube.

A central passage in the proximal connector communicates fluid pressure between the interior of the main insertion tube and the interior of the bladder, to permit controlled inflation of the bladder. The wires and optical fibers that extend from the viewing head pass through this central passage and then through the main insertion tube and exit the proximal end thereof.

A resiliently bendable, but axially incompressible spine is disposed to one side of the axis of the bending neck, preferably between the bladder and braid, and extends from the distal fitting to the proximal connector. When fluid pressure is applied to the interior of the bladder, the braid expands laterally and shortens axially on the side away from the spine thereby bending the neck a controlled amount that depends on the fluid pressure applied.

Preferably, the spine is biased, or naturally formed in an arc or bow bent to the spine side of the bending neck. When the applied pressure is at a zero or threshold pressure, the neck is biased to that side. When full pressure is applied, the neck is bent arcuately in the opposite direction. At an intermediate pressure the bending neck extends straight. The degree of curvature within the plane of bending is more or less proportional to the applied pressure.

In this invention the "pumping" that occurs as a result of the bending neck action is accommodated by expansion or contraction of the main insertion tube. That is, when the steering section is bent one way due to increased fluid pressure there is a compensating lengthening of the main insertion tube, and when the steering section is bent the other way due to a reduction in fluid pressure there is a corresponding shortening of the main insertion tube. Thus, the fibers and wires are pulled out slightly from the bending neck when it is shortened, and are moved back into the neck when it is lengthened. This permits rapid steering of the bending neck without straining the wires or fiber optic bundle, and provides a fixed point at the control section for sealing between the proximal end of the insertion tube and the wires and fibers.

To achieve this, the insertion tube is formed of an elastic flexible tube that is surrounded by braiding or winding of one or more filaments. This can be in the form of helical windings of opposite sense, but with a very large braid angle, i.e. approaching 90 degrees from the tube axis.

The large braid angle prevents internal pressure from expanding the tube diameter, but does not interfere with axial elongation caused by action of the fluid pressure against the proximal and distal ends of the tube. By contrast, the braid angle in the bending neck or steering section is well below 45 degrees, and can be less than 30 degrees.

To perform properly for steering, the insertion tube should be quite elastic. This elasticity ensures that when gas or fluid pressure is reduced, the insertion tube shortens immediately and thereby encourages the fibers and wires to move towards the bending neck. Any delay in shortening of the insertion tube could produce a pull on the wires and fibers that limits or reduces return of the bending neck to its natural or pressure-off deflection shape. Urethane is quite suitable as a material for the elastomeric tube because of its good elasticity and low return delay.

A plastic jacket around the optical fibers has an opening cut through it to equalize the pressure in the insertion tube with and the pressure in the fiber bundle. This prevents collapse and stiffening of the fiber optic bundle.

A pressure tee is provided at the proximal end of the insertion tube assembly and is bonded to it. An inlet tube communicates through to the interior of the insertion tube to connect to a controlled source of pressurized gas or other fluid.

The insertion tube assembly of this invention can be of any desired length, i.e., up to fifteen meters or more, and can be of small diameter, e.g. 4 to 6 mm or less.

The above and many other objects, features, and advantages of this invention will become apparent from the ensuing description of a preferred embodiment, which should be read in connection with the accompanying Drawing.

DETAILED DESCRIPTION OF THE PREFERRED EMBODIMENT

Figures 1, 2:
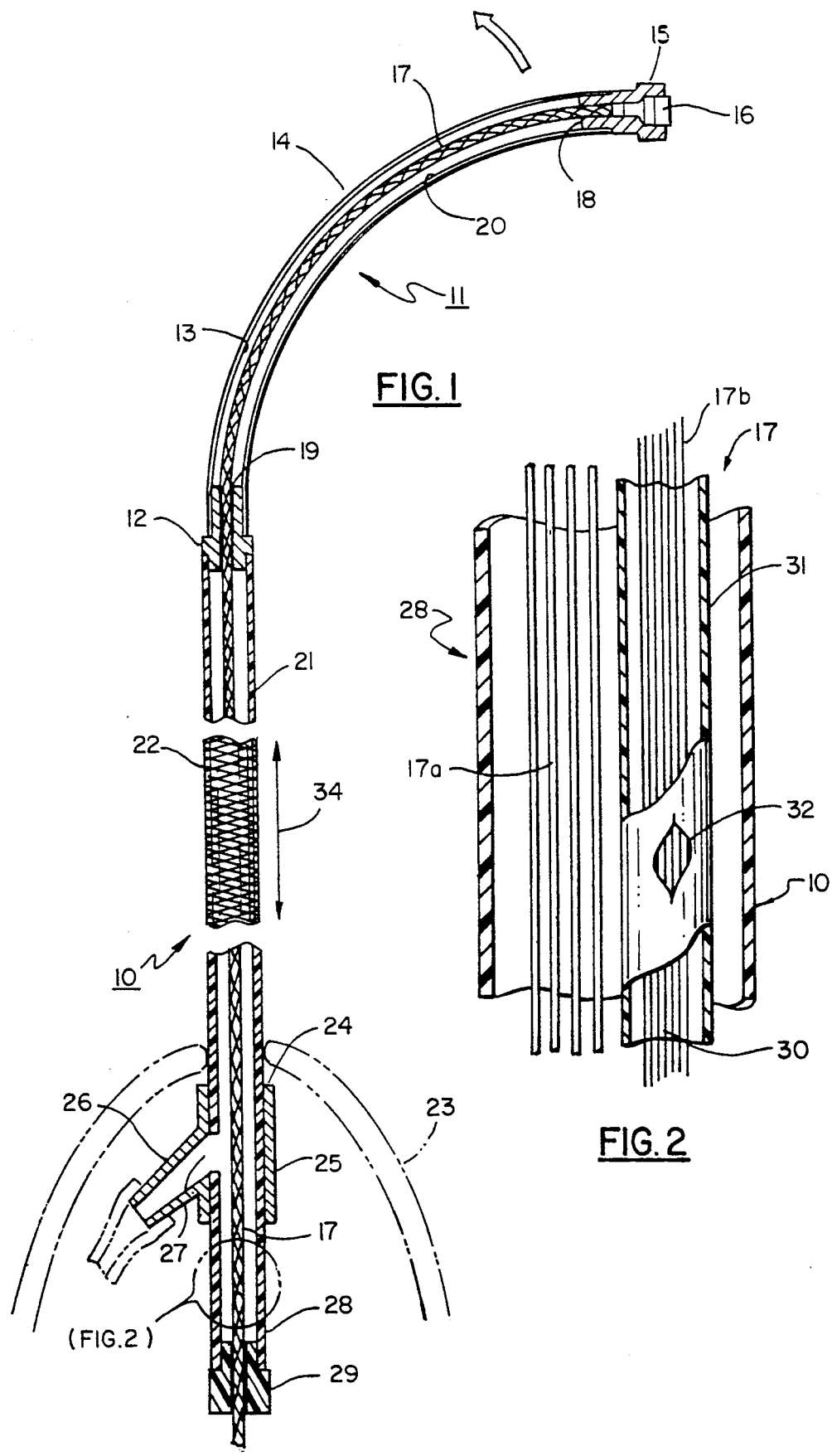
FIG. 1 is a sectional view of an insertion tube assembly including a tubular fluid-controlled bending neck, according to one embodiment of the present invention.
FIG. 2 is an enlargement of a portion of the insertion tube assembly as indicated in FIG. 1.

With reference to the Drawing, and initially to FIG. 1 thereof, a small-diameter flexible video probe is shown to include a hollow flexible insertion tube 10, having a bending neck assembly 11 attached at its distal end. The assembly 11 has a proximal connector 12 that fits into the insertion tube 10 and serves as an attachment point for an elongated tubular elastomeric bladder 13. A braid 14, which is formed of helically wound, substantially inextensible filaments, some of which are right-hand wound and some of which are left-hand wound, surrounds the bladder 13 and has its proximal end attached to the connector 12. A distal fitting 15 seals the distal end of the bladder 13 and is mechanically attached to the distal end of the tubular braid 14. In this embodiment, there is a miniature video camera and optics canister 16 situated in the fitting 15. A signal conduit 17, which includes a wire bundle 17a that carries signals to and from the video canister 16, and also includes a fiber optic bundle 17b for illumination, reaches the canister 16 through a receptacle 18 in the distal fitting 15. The conduit 17 proceeds proximally within the bladder 13 and continues generally along the axis of the bending neck 11 and out through a central passage 19 in the proximal connector 12. From that point, the conduit 17 proceeds through the insertion tube 10 to its proximal end where it exits the tube 10 and proceeds to a control processor and viewer (not shown) located at the proximal end of the insertion tube.

Figure 3:
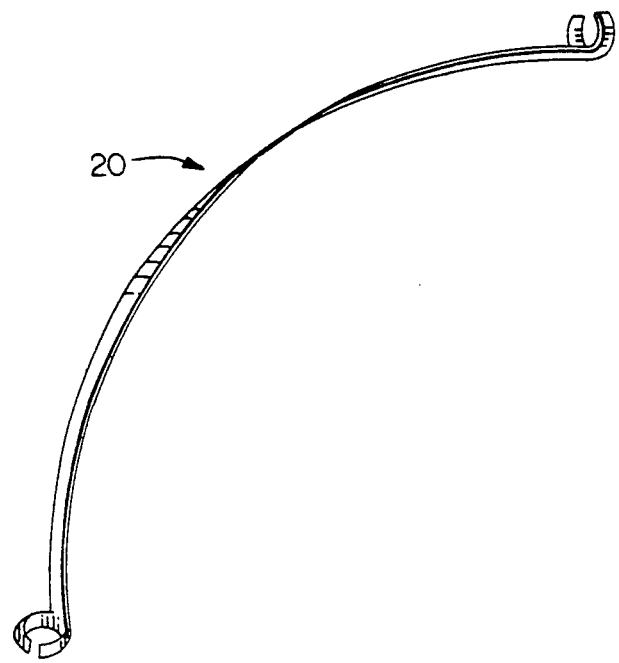
FIG. 3 illustrates the flexible resilient spine employed in this embodiment.

A flexible resilient spine 20 at the interface between the bladder 13 and the braid 14 is disposed at one side of the bending neck 11, i.e. at the right side as shown in FIG. 1. As more fully discussed in U.S. Pat. No. 5,018,506 and as illustrated in FIG. 3 hereof the spine 20 has an elongated leaf that is flexible but resists axial contraction. The leaf is arcuately biased, i.e. is set into a curve of a predetermined arc, of e.g. 60° to 150°. This leaf can be oblong in cross section with the long dimension being disposed along the braid/bladder interface. The cross-sectional dimension can typically be 0.100 by 0.006 inches. Generally cylindrical clamp portions are formed at the proximal and distal ends of the spine 20.

Figure 4:
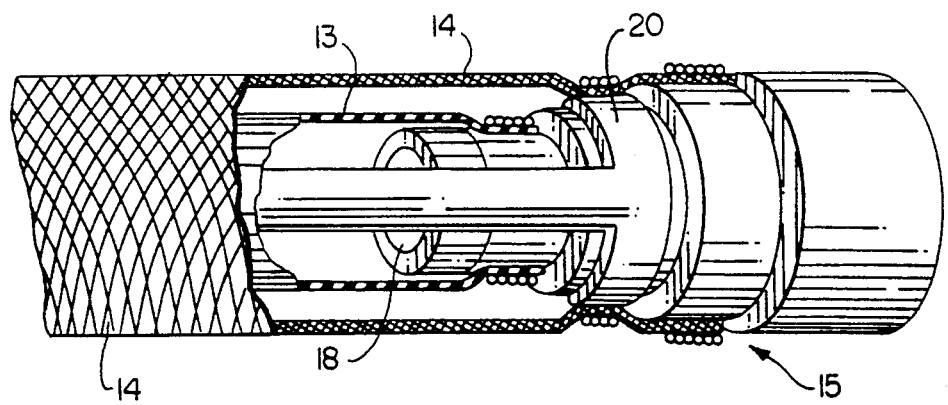

These clamp portions attach by interference fit, adhesive, and wraps of cording or monofilament to the connector 12 and fitting 15, respectively. The attachment of the distal fitting 15 to the distal end of the spine 20, the bladder 13 and the braid 14 is shown in FIG. 4.

The proximal connector 12 can be a generally tubular sleeve that fits into the insertion tube 10, with an annular land that matches the diameter of the insertion tube. Distally of this land, a tube barb receives the proximal end of the bladder 13 which can be secured onto it by cement and tied on it with a suitable monofilament cord. An annular step receives the proximal clamp of the spine 20, and another step receives the proximal end of the braid 14, which is secured to it with a suitable cement. The distal end fitting 15 can also have a tube barb that receives the distal end of the bladder 13, which can be suitably secured and sealed to it with a cement and tied with coils of monofilament cord. Distally of the tube barb, an annular step receives the distal clamp of the spine 20, and another step receives the distal end of the braid 14 which is cemented to it with a suitable cement. Monofilament wraps secure the braid and bladder onto the connector 2 and the fitting 15.

Compressed air or other pressurized fluid is supplied through a suitable pressure regulator to the interior of the insertion tube 10. The fluid pressure is varied accurately over a range, e.g. from 0 to 100 psig. There is a clearance between the interior of the central passage 19 and the signal conduit 17 to permit fluid communication between the interior of the insertion tube 10 and the interior of the bladder 13. When a zero or sub-threshold pressure is applied to the interior of the insertion tube 10 and bladder 13, the spine 20 holds the bending neck 11 in its repose position, e.g. bent fully to the right, as shown in FIG. 1. As the pressure is increased, the bladder 13 will inflate and will expand laterally. The effect of the helical braid 14 is to permit the bladder to expand laterally only, thereby reducing its axial length. However, the braid can shorten only on the side away from the spine 20. Thus, as the pressure increases within the bladder 13, the bending neck 11 bends in the direction of the arrow, i.e. to the left in the drawing. At full pressure, the bending neck 11 is bent in the opposite direction in the bending plane, i.e., 60° or more to the left. To obtain a straight bending neck, an intermediate pressure is applied. For any particular degree of bending, the bending neck 11 assumes a smooth arcuate curve, and is not subject to the segmented bending characteristics of cable-drive articulation mechanisms of the type mentioned previously.

The bending neck 11 can be operated either pneumatically or hydraulically. Because of its simple design, the diameter of the entire mechanism can be kept quite small, permitting construction of an articulatable probe of less than 6 mm diameter. Also, because the air or hydraulic pressure can be accurately controlled, the bending neck 11 can be constructed to operate with negligible play or hysteresis.

Because the spine 20 is of fixed length but is offset to one side of the bending neck 11, any bending to the left of the neck will shorten its axial length, and any bending to the right will elongate it. As the conduit 17 lies on the central axis, bending motion of the neck 11 will pump the conduit out from or into the neck through the central passage 19 in the connector 12. If the conduit were not free to move axially through the passage 19, then the deflection of the neck could impose stress on the fibers in the conduit, and at the same time the conduit, which is more or less rigid in the axial direction, could interfere with deflection of the neck. However, in order to inflate the neck 11, the inside of the main insertion tube 10 is pressurized, and this requires sealing up the insertion tube at the point where the conduit 17 exits it. This in turn means that the wires and fibers are clamped at that exit point against axial motion relative to the insertion tube 10.

According to this invention, the main insertion tube is constructed so as to elongate under fluid pressure and to contract when pressure is relieved so as to compensate for the shortening and elongation of the bending neck when it undergoes deflection. This generates axial space for the conduit 17 during steering, and also provides an axially fixed point of the conduit relative to the insertion tube at which to place a gas seal. That is, pumping of the conduit 17 out of the bending neck 11 during steering is compensated by lengthening of the insertion tube 10. During return steering, i.e., with decreased fluid pressure, the insertion tube 10 becomes shorter thereby allowing the wires and fibers of the conduit to move towards the bending neck.

As further shown in FIG. 1, the insertion tube 10 has a wall construction in which a urethane tube 21 is covered with a braid 22 formed of fibers or filaments that are wound or braided, using a large braid angle. The braid angle is over 45 degrees, and most preferably approaching 90 degrees relative to the axial direction of the tube. The large angle keeps internal pressure from increasing the diameter of the tube 10, but does not interfere with axial elongation caused by action of the pressurized gas or other fluid against the ends of the tube. To perform properly for effective steering of the bending neck, the insertion tube should be highly elastic, with low hysteresis losses. Elasticity ensures that when the fluid pressure is reduced the insertion tube grows shorter immediately, and this encourages the wires and fibers of the conduit 17 to move towards the bending neck 11. Any delay in shortening of the tube 10 effectively produces a tension or pull on the wires and fibers that limits or reduces return of the bending neck to its pressure-off shape. Urethane has been found to be a suitable material for the tubing 21, and is more elastic with less delay than some other materials such as PVC.

In this case, the braid 22 is formed of filaments that cross one another, some being right hand wound and some left hand wound. In other embodiments, a single coil of windings could be employed. Preferably, the braid is attached onto the surface of the tubing 21 using a flexible urethane paint.

A control section housing 23, here shown in ghost, is disposed at a proximal end of the insertion tube 10, as is the case in other probes or scopes. A hand control (not shown) controls the pressure applied to the interior of the insertion tube 10. Inside this housing 23 a pressure fitting or tee 24 is disposed on the insertion tube, with a sleeve 25 being sealed onto the insertion tube with epoxy or the equivalent, and a branch or inlet tube 26 that connects to a pressure control regulator (not shown). A hole or opening 27 is drilled or otherwise formed in the wall of the insertion tube 10 and is aligned with the inlet tube 26. A proximal extension 28 of the tube 10 protrudes proximally a short distance beyond the tee 24 and terminates at an end fitting or plug 29 that seals the proximal end of the tube 10 from which the conduit 17 continues to a video control unit, light source, and/or other appropriate equipment well known in this art.

As shown in the enlargement of FIG. 2, the fiber optic bundle 17b of the conduit 17 includes a group of illumination fibers 30 covered with a sheath 31 or jacket formed of vinyl or urethane tubing. At least one port 32 consisting of a hole or slit is provided in the sheat 31 in the proximal extension to allow the pressure to be equalized in the sheath to match the controlled pressure applied to the inside of the insertion tube 10. This keeps the sheath or jacket from collapsing onto the fibers 30 which could impair its pumping movement during steering. Also shown in FIG. 2 are video and signal wires 17a that extend from the camera and optics canister 16, through the connector passage 19 and the insertion tube 10 and out the end fitting 29.

An arrow 34 in FIG. 1 indicates the direction of elongation of the insertion tube when the controlled fluid pressure is increased.

With the improved insertion tube construction of this invention, axial pumping motion of the fibers and wires is accommodated which facilitates steering without delays and with minimal resistance. The invention permits the insertion tube itself to be used as the pressure conduit for steering, as a seal can be formed or installed at the proximal end where there is no relative motion between the insertion tube 10 and the wires and fibers.

In this embodiment, the entire insertion tube 10 from the connector 12 back is formed o the urethane tubing 21 and high-angle braid 22. However, in other embodiments the insertion tube can be constructed with only a portion of its length being of this tube and braid construction. Also, while a plug 29 is employed here as a proximal sealing member, it would be equivalent, for example, to pot the proximal end of the tube 10 in epoxy. Also in this embodiment, as discussed above, a flexible urethane paint or coating is employed to prevent the braid 22 from shifting on the tubing 21, to protect the braid 22 from snagging, and to make the surface of the insertion tube smoother. In other embodiments, other coatings could be employed.

Also in this embodiment, the video canister 16 contains for example a CCD solid state imager that communicates a video image over wires 17a, and the optical fibers 30 carry illumination forward to the distal tip of the probe. However, a so-called fiberscope or optical probe could also be constructed according to the principles of this invention, in which the wires 17a are replaced by a coherent optical fiber bundle that would carry image information to a viewer.

While this invention has been described with reference to a preferred embodiment, it should be understood that the invention is not limited to that precise embodiment. Rather, many modifications and variations would present themselves to those of skill in the art without departure from the scope and spirit of this invention as defined in the appended claims.

What is claimed is:

1. Flexible elongated insertion tube assembly for a borescope or endoscope comprising a distal viewing head which includes an imaging device to capture image information of an object and to convey said image information to a proximal end of said insertion tube assembly; a tubular fluid-controlled bending neck that includes an elongated tubular elastomeric bladder, a tubular braid disposed over said bladder and confining same, a distal fitting supporting said head and sealing the distal end of the bladder and mechanically attaching to a distal end of the braid, a proximal connector to which the proximal end of the said tubular bladder is sealably fitted and to which the proximal end of said braid is anchored, and an elastically bendable but substantially axially incompressible spine disposed to one side of said bladder and including means at its proximal and distal ends mechanically fixed to said connector and to said fitting, said fitting having a central opening communicating fluid pressure to an interior of the bladder, such that when fluid pressure is applied to said interior of the bladder, the braid expands laterally and shortens axially on one side, thereby bending the neck a controlled amount that depends on the fluid pressure applied; a tubular flexible main insertion tube that is joined at a distal end thereof to the proximal connector of said bending neck and that extends to a proximal end including means sealing its proximal end; a fiber optical bundle that extends from said head through said bending neck, said connector, and said main insertion tube and is sealed in said sealing means and exits the proximal end of said main insertion tube at said sealing means; a fluid inlet fitting at said proximal end of said main insertion tube including inlet means for admitting a fluid under controlled pressure into the interior of said main insertion tube to communicate with the interior of the bladder of said bending neck; and wherein said main insertion tube includes means which elongates the main insertion tube under increasing pressure of said fluid to compensate for the shortening of said bending neck under increasing fluid pressure and which shortens the main insertion tube under decreasing pressure of said fluid to compensate for the elongation of said bending neck under decreasing fluid pressure such that the bending of the neck imposes no axial strain on the optical fiber bundle.

2. Flexible insertion tube assembly according to claim 1 wherein said means which elongates the insertion tube includes at least a portion of said main insertion tube being formed of a flexible elastomer tube and a winding over said elastomer tube of at least one filament wound at an angle relative to the axis of the main insertion tube that substantially exceeds 45 degrees.

3. Flexible insertion tube assembly according to claim 1, wherein said fluid inlet fitting is in the form of a tee having a tubular portion overfitting the main insertion tube in advance of its proximal end and a fluid inlet tube communicating fluid pressure through an aperture in said main insertion tube.

4. Flexible insertion tube assembly according to claim 3 wherein said fluid inlet tube is angled proximally.

5. Flexible insertion tube assembly according to claim 2 wherein the angle of said winding is nearly 90 degrees.

6. Flexible insertion tube assembly according to claim 5 wherein said elastomer is urethane.

7. Flexible insertion tube assembly according to claim 1 wherein said optical fiber bundle has an elastomeric sheath containing a pressure communicating port to communicate fluid pressure between the interior of the sheath and the interior of the insertion tube.

8. Flexible insertion tube assembly according to claim 1 further comprising an electrical wire bundle that extends from said head through said bending neck, said connector, and said main insertion tube and is sealed in said sealing means and exits the proximal end of said main insertion tube at said sealing means.

* * * * *